US009463589B2

(12) United States Patent
Boucherie

(10) Patent No.: US 9,463,589 B2
(45) Date of Patent: Oct. 11, 2016

(54) INJECTION MOLDING TOOL

(71) Applicant: G.B. Boucherie NV, Izegem (BE)

(72) Inventor: Bart Gerard Boucherie, Izegem (BE)

(73) Assignee: G.B. Boucherie NV, Izegem (BE)

( * ) Notice: Subject to any disclaimer, the term of this patent is extended or adjusted under 35 U.S.C. 154(b) by 49 days.

(21) Appl. No.: 14/387,255

(22) PCT Filed: Mar. 26, 2013

(86) PCT No.: PCT/EP2013/056351
§ 371 (c)(1),
(2) Date: Sep. 23, 2014

(87) PCT Pub. No.: WO2013/144115
PCT Pub. Date: Oct. 3, 2013

(65) Prior Publication Data
US 2015/0190957 A1    Jul. 9, 2015

(30) Foreign Application Priority Data
Mar. 30, 2012   (DE) .................. 10 2012 006 579

(51) Int. Cl.
| B29C 45/16 | (2006.01) |
| B29C 45/66 | (2006.01) |
| B29L 31/42 | (2006.01) |
| B29C 45/04 | (2006.01) |

(52) U.S. Cl.
CPC ............ B29C 45/66 (2013.01); B29C 45/162 (2013.01); B29C 45/1628 (2013.01); *B29C 45/0433* (2013.01); *B29C 45/1618* (2013.01); *B29C 2045/1617* (2013.01); *B29L 2031/425* (2013.01)

(58) Field of Classification Search
CPC .......... B29C 45/0433; B29C 45/1618; B29C 45/162; B29C 45/1628; B29C 45/66; B29C 2045/1617
See application file for complete search history.

(56) References Cited

U.S. PATENT DOCUMENTS

| 4,427,359 A | 1/1984 | Fukuoka et al. |
| 7,871,260 B2 | 1/2011 | Boucherie |
| 8,360,764 B2 | 1/2013 | Armbruster et al. |
| 8,951,035 B2 * | 2/2015 | Boucherie ........... B29C 45/1628 |
| | | 264/255 |
| 9,050,742 B2 * | 6/2015 | Boucherie ............. B29C 45/045 |
| 2006/0023138 A1 | 2/2006 | Choi et al. |
| 2010/0276836 A1 | 11/2010 | Armbruster et al. |
| 2011/0117233 A1 | 5/2011 | Boucherie |

FOREIGN PATENT DOCUMENTS

| DE | 1002005029365 | 1/2007 |
| WO | 9901055 | 1/1999 |

OTHER PUBLICATIONS

English translation of the International Preliminary Report on Patentability for PCT/EP2013/056351, mailed Oct. 9, 2014.
International Search Report, dated Sep. 18, 2013.

* cited by examiner

*Primary Examiner* — James Mackey
(74) *Attorney, Agent, or Firm* — Carlson, Gaskey & Olds, PC

(57) ABSTRACT

An injection molding tool has a central tool part and two lateral tool parts which are shiftable relative to each other between an open and a closed position. At least one injection molding cavity is defined by a central mold part which is arranged on the central tool part, by a lateral mold part which is arranged on the lateral tool part, and by a movable mold part which is mounted on a holder. The holder is shiftable around the central tool part between various positions by using a drive. The holder can be coupled with the drive in a controlled manner.

22 Claims, 7 Drawing Sheets

INJECTION MOLDING TOOL

RELATED APPLICATION

This is the U.S. national phase of PCT/EP2013/056351, filed Mar. 26, 2013, which claims priority to DE 10 2012 006 579.5, filed Mar. 30, 2012.

TECHNICAL FIELD

This invention relates to an injection molding tool with a central tool part and two lateral tool parts which are shiftable relative to each other between an open and a closed position. At least one injection molding cavity is defined by a central mold part arranged on the central tool part, a lateral mold part arranged on the lateral tool part, and a movable mold part mounted on a holder. The holder is shiftable around the central tool part between various positions by a drive.

BACKGROUND

Such an injection molding tool is known from EP 2 324 980. The holder can be shifted along side faces of the central tool part by the drive, so that the movable mold part, for example, can be shifted between a first injection station, a cooling station, a second injection station, and an ejector station. The movable mold part is designed such that it transports the injection-molded blanks from machining station to machining station.

The drive can be designed, for example, in the form of a belt drive with which all holders are firmly coupled. In this way, all holders can simultaneously be moved at a fixed distance to each other. Alternatively, it is provided that each holder is provided with its own servo drive. This provides for individually moving the holders in different increments.

One example objective of the invention is to develop an injection molding tool as mentioned above to the effect that the holders can flexibly be moved with little design effort.

SUMMARY

An injection molding tool, as mentioned above, provides a solution for the objective by providing a holder that can be coupled with the drive in a controlled manner. The invention is based on the fundamental idea to use no permanent coupling between holder and drive, but only a temporary coupling which can again be eliminated when the holder is in the desired position. In comparison with a solution in which each holder has its own servo drive, those problems are avoided which arise with regard to the energy supply and signal transmission to a servo motor which must perform a plurality of revolutions at the central tool part. As compared to a solution with a single belt drive, with which the holders are firmly coupled, the advantage is obtained that variable increments of the holders are possible.

According to one aspect of the invention, it is provided that the two lateral tool parts cooperate with two side faces of the central tool part, and that the drive is arranged on an end face of the central tool part. In this aspect, the drive is arranged in a region in which much room is available, so that in the region of the injection molding cavities the injection molding tool can be designed exclusively with regard to the technical injection molding requirements.

Preferably, it is provided that the drive is arranged on only one end face of the central tool part. This embodiment is based on the finding that with a suitably stiff design of the holder, an asymmetric connection between the holder and drive can be used without this having negative effects on the precise positioning of the movable mold part. Furthermore, reduced costs are incurred for the drive which must be present on only one side of the injection molding tool. Finally, no expenditure is incurred at all for a synchronization between drives which are arranged on two sides of the injection molding tool.

According to a preferred embodiment, it is provided that the drive includes at least one swivel arm which is shiftable between two positions. Expressed in general terms, this embodiment uses a reciprocating swivel arm which seizes a holder to be moved on at a first position and then moves the same holder into the second position. Subsequently, the swivel arm is released from the holder, so that it can be shifted back into the first position and there can seize the next holder.

When a larger number of positions is provided, between which the individual holders must be shifted, a corresponding number of swivel arms is provided, so that the holders are "passed on" between the individual swivel arms. A swivel arm thus shifts a holder from a first into a second position, from where it is shifted by a second swivel arm into a third position in which it is "picked up" and moved on by a third swivel arm.

Preferably, it is provided that an inner end of the swivel arm is coupled with an actuator which is mounted at the central tool part. The actuator, for example, can be a servo drive with which the swivel arm can precisely be shifted between the desired positions. By mounting the actuator at the central tool part, a stable and compact construction is obtained.

Preferably, it is provided that an outer end of the swivel arm can be coupled with the holder. For this purpose, it can be provided that at least the outer end of the swivel arm can perform a stroke parallel to a swivel axis defined by the swivel arm, in order to be coupled with the holder or be released from the same. Expressed in other words, the outer end of the swivel arm (or also the entire swivel arm) is lifted and put onto the holder from above, so that the holder can mechanically be coupled with the swivel arm and be moved on by the same.

Alternatively, it can be provided that the swivel arm can be telescopically extended to the outside, in order to be coupled with the holder or be released from the same. In this configuration, the outer end which, for example can be designed fork-like, is shifted to the outside, so that it is coupled with the holder and is able to move the same on.

According to one embodiment of the invention it is provided that the swivel arm is designed as double arm and includes two outer ends. In this embodiment, the swivel arm can shift the holder between a total of three positions, which are realized by the geometric arrangement of the arms relative to each other. When the two arms of the swivel arm extend at an angle of 90° to each other, the swivel arm can shift a holder with its first arm from a first position by 90° into a second position. After the swivel arm is released from the holder, the swivel arm is shifted back by 90°, so that the second arm "picks up" the holder in the second position and moves the same on into a third position. At the same time, the first arm can shift a second holder from the first position into the second position.

According to an alternative to using swivel arms, it can be provided that a traction drive is used as the drive. The holders can be coupled with the traction drive, for example a chain or a belt, when they must be moved on, and be released again, when they have reached the new position.

In principle, a single traction drive can be used in order to move the holders on. According to an alternative to using a single traction drive, it can be provided that the drive includes two or more traction drives which all extend along a circumference of the central tool part and to each of which a separate actuator is associated. The traction drives can be operated with different speeds, so that the holder which between a first and a second position must cover a larger travel distance than the other holder is coupled with a traction drive which has a higher shifting speed. This provides for moving all holders from their respective first position into their respective second position within the same period.

Alternatively, it can be provided that the drive includes two or more traction drives which are each arranged along a part of the circumference of the central tool part and to each of which a separate actuator is associated. This embodiment corresponds to the fundamental idea of the embodiment with several swivel arms, since here as well different sub-assemblies of the drive are used, whose function is to move the holder on from a first position into a second position. From this position, the corresponding holder is then moved on by the "next" traction drive into the next following position.

Preferably, it is provided that the holder includes at least one carriage which is shiftably mounted on a rail. A carriage which cooperates with a rail is particularly useful for the precise, and at the same time, low-friction guidance of the holder.

Preferably, it is provided that the carriage is mounted on the rail substantially without clearance by at least one double ball bearing. In particular in combination with associated guide surfaces, which are slightly offset relative to each other, a compact guidance is obtained for the holder, which is free from clearance.

According to one aspect of the invention. it is provided that the holder includes a transverse strut which is connected with the carriage and on which the movable mold part is mounted. In this aspect, the movable mold part thus is mounted on a rigid bridge which extends across the side faces of the central tool part. If desired, a rail can be provided both on the upper end face and on the lower end face of the central tool part, in which the holder then is guided by an upper carriage and a lower carriage. In principle, it is also conceivable to merely use one single carriage and to design the transverse strut in a cantilevered manner.

Preferably, it is provided that the movable mold part is shiftable at the transverse strut between an injection molding position and an extracted position. In this aspect, it hence is not necessary to shift the entire transverse strut in order to release the movable mold part from the central mold part. Instead, only the movable mold part is shifted, which is mounted on the transverse strut by a compact sliding guideway. As a result, the movable mold part can passively be shifted against the central tool part on closing of the injection mold, and on opening of the injection mold can actively be extracted by a lifter.

BRIEF DESCRIPTION OF THE DRAWINGS

The invention will be described below with reference to various embodiments which are represented in the attached drawings, in which.

DETAILED DESCRIPTION

Figure 1:
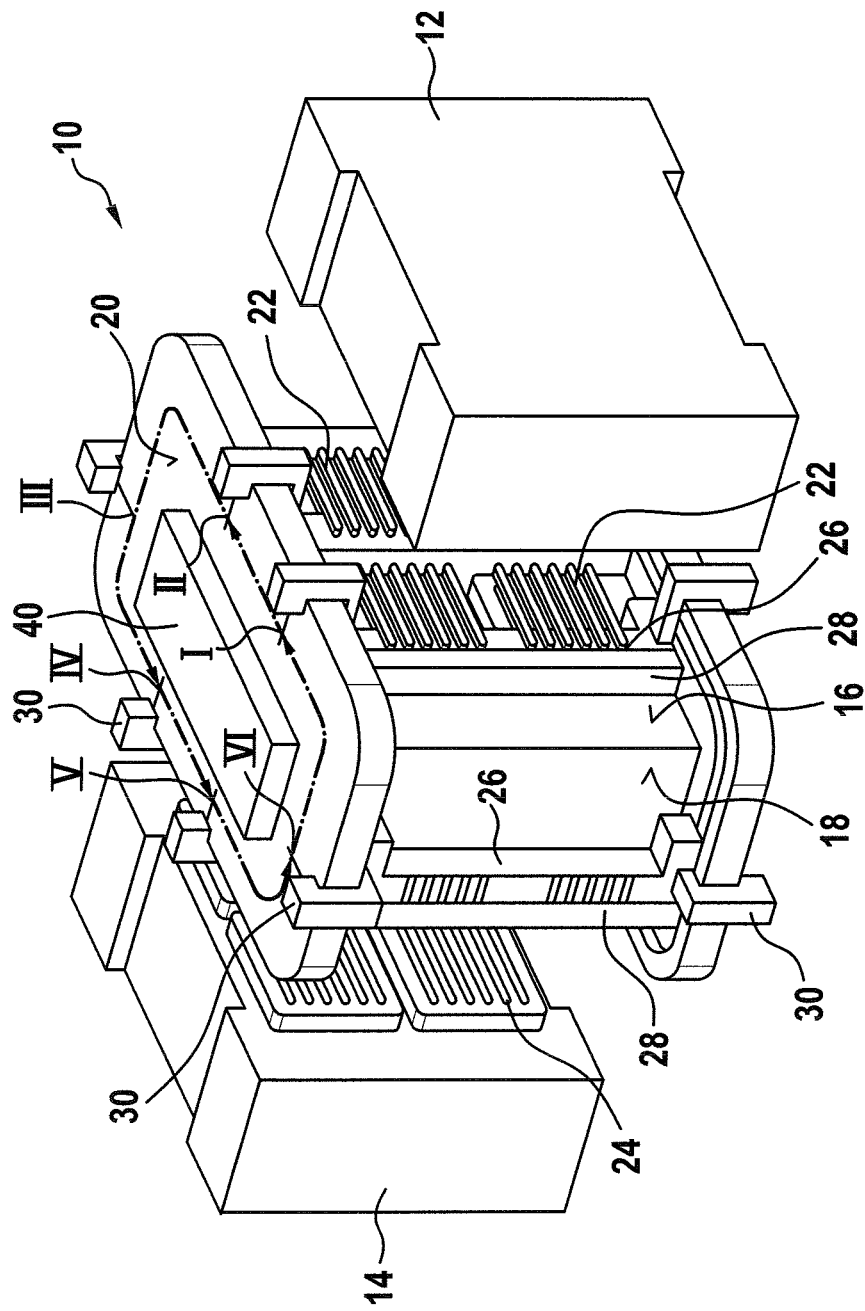
FIG. 1 shows a schematic, perspective view of an injection molding tool according to the invention.

FIG. 1 schematically shows an injection molding tool which includes a central tool part 10 and two lateral tool parts 12, 14. The central tool part 10 is of generally block-shaped design and includes a total of four side faces, of which only two side faces 16, 18 are visible, as well as two end faces of which only one end face 20 is visible. On two of the opposed side faces (the side face 16 and the side face extending parallel thereto) central mold parts 22 are arranged, which cooperate with lateral mold parts 24 which are arranged on the lateral tool parts 12, 14. Together with movable mold parts 26, injection molding cavities can be formed when the injection molding tool is in the closed position, i.e. the central tool part 10 is urged against the stationary lateral tool part 12 and the second lateral tool part 14 is urged against the side face of the central tool part 10 parallel to the side face 16.

The movable mold part 26 is mounted on a transverse strut 28 which extends along the side faces of the central tool part 10 from one end face to the other end face. Each end of the transverse strut 28 is connected with a carriage 30. The transverse strut 28 together with the carriage 30 forms a holder 28, 30 for the movable mold part 26. The two lateral tool parts 12, 14 include corresponding recesses in which the transverse strut 28 is accommodated when the injection molding tool is in a closed position.

As can be seen in FIG. 1, the injection molding tool is provided with several of the holders 28, 30. The same can be shifted between various positions around the side faces of the central tool part 10. An example for the revolution of the holders 28, 30, and hence of the movable mold parts 26, between various positions is shown in FIG. 1. In a first position I, for example, a first component can be injection-molded. Subsequently, the movable mold part 26 is extracted there and moved on into a position II in which a second component is injection-molded. In a next cycle the movable mold part 26 is extracted there and shifted into a position III, which can be a cooling station. In the next machine cycle, the corresponding holder 28 is moved on into a position IV in which for example a third component can be injection-molded. In the following machine cycle, the movable mold part 26 is extracted there and moved on into a position V in which a fourth component can be injection-molded. In the next machine cycle, the corresponding mold part 26 (and hence the injection-molded plastic parts) is extracted in station V and shifted into a position VI, which can be an ejection station. With regard to the efficiency, preferably so many holders and movable mold parts 26 are used as stations are present at the injection molding tool. In this way, machining can be performed with every machine cycle, for example an injection molding operation or a cooling operation. It is also possible to provide other machining stations, for example a station in which additional components are mounted at the injection-molded components, or a station for mechanically machining the injection-molded blanks. It is also possible to omit for example the station provided at position III, so that the holders 28, 30 are moved directly from the side face 16 onto the second side face extending parallel thereto. It is also possible to employ only one station at one of the side faces or at both side faces.

The embodiment shown in FIG. 1 is an example which can be modified in many ways. For example, on the side face 16 and the side face extending parallel thereto the same (i.e. identical) central mold parts 22 can be arranged, which cooperate with lateral mold parts 24 which are arranged on the lateral tool parts 12, 14 and in turn are identical with each other. Together with the movable mold parts 26 injection molding cavities thus are formed, which all are identical.

In position III (FIG. 1) an ejection station then is provided, just like in position VI of FIG. 1. Thus, the products which are injection-molded at position I and/or at position II are ejected in position III, and the products which are injection-molded in position IV and/or position V are ejected in position VI. Hence it follows that in a machine cycle, i.e. an injection-molding cycle, both on the "front side" (namely the side face 16 visible in FIG. 1) and on the "back side" finished products are produced, which in the succeeding machine cycle are ejected at the corresponding ejection station III or VI. The tool then is operated as a 1-component injection molding tool.

In the preceding examples it has been assumed that the holders 28, 30 always are shifted in the same direction, i.e. in a rotating manner. It is, however, also possible to move the holders back and forth when a 1-component product is produced. The molded parts, which for example have been injection-molded in position I, then can be ejected once in position III and once in position VI, whereas the molded parts of position V are ejected once in position VI and once in position III.

When the cavities, however, are identical with each other in positions I and IV and the cavities in positions II and V also are identical with each other, 2-component products are produced both on the front side and on the back side.

It can be seen that the holders 28, 30 must cover different paths when they are moved on from one station to the next. The necessary variable increments on shifting between the individual positions are possible by using a drive 40 schematically shown in FIG. 1, with which the holders 28, 30 can be coupled in a controlled manner. "Coupled in a controlled manner" means that they are selectively connected with the drive 40 at certain times, so that the same can move the holders 28, 30, and they likewise can again selectively be released from the drive 40. In particular, coupling occurs in a first position and in a second position the coupling to the drive 40 is released again. In this way, the holders 28, 30 can be moved with different increments around the side faces of the central tool part 10.

Figure 2:
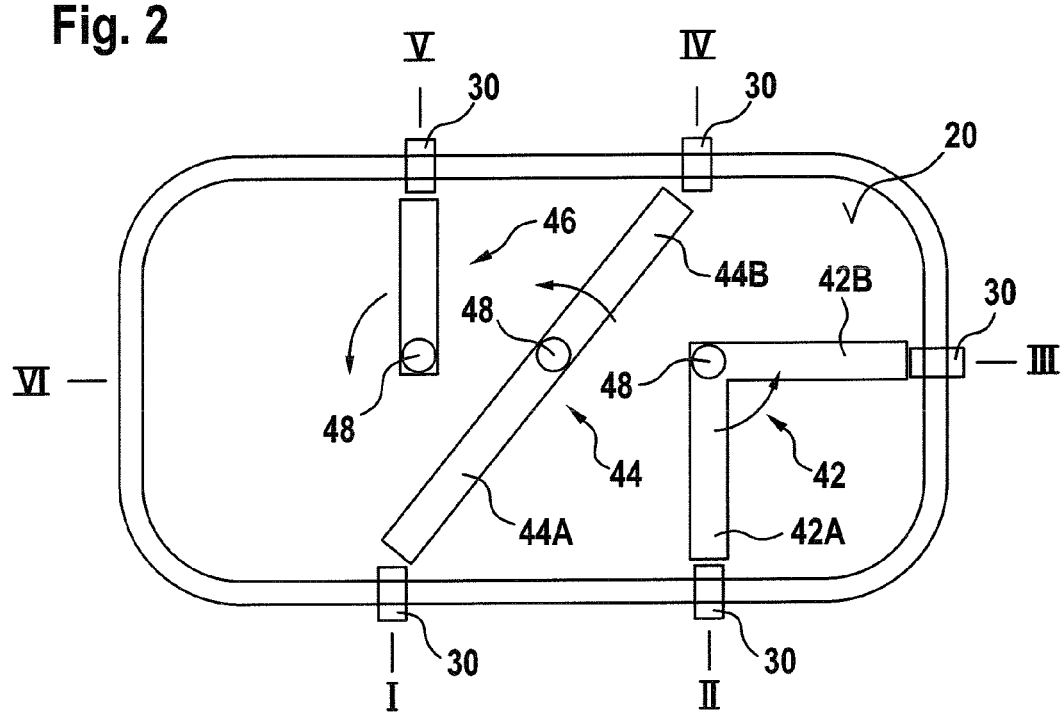
FIG. 2 shows a schematic top view of an injection molding tool according to a first embodiment of the invention.

A first configuration of the drive 40 will be described below with reference to FIGS. 2 to 4.

In the first embodiment, the drive 40 includes several swivel arms 42, 44, 46, which are pivotally mounted on the end face 20 of the central tool part 10. In the embodiment shown, actuators 48 are used for this purpose, which are mounted on the end face 20 and, for example, can be designed as a servo motor. By using the actuators 48, each swivel arm 42, 44, 46 can be moved from the position shown in FIG. 2 in the direction of the arrows. In this way, the carriage 30 which just is in position I can be moved into position II, while at the same time the carriage 30 present at position IV is moved on into position V. By pivoting the swivel arm 46, the carriage 30 present at position V at the same time can be moved on into position I. Finally, by pivoting the swivel arm 42, the carriage present in position II can be moved on into position III, while the carriage present in position III is moved on into position IV.

The swivel arm 42 is designed as double arm with two arms 42A, 42B, which are arranged at right angles to each other. The swivel arm 44 also is a double arm, wherein its two arms 44A, 44B are arranged on one line. The swivel arm 46, on the other hand, is a one-armed configuration.

Dependent on the geometrical conditions, the swivel arms 42, 44, 46 can also be arranged at other points of the end face 20. In the case of double-armed swivel arms, it is also possible to arrange the arms at other angles relative to each other than this is shown for the embodiment according to FIG. 2.

To releasably couple the carriages 30 of the holders 28, 30 with the swivel arms, the swivel arms 42, 44, 46 altogether can perform a stroke parallel to their swivel axis. This is shown in FIG. 3 for the swivel arm 44. An outer end 50 of the swivel arm 44 is provided with a groove 52, which can be put onto a guide pin 54 which is provided at the carriage 30. As soon as the outer end 50 of the corresponding swivel arm is put onto the carriage 30 in direction of the arrow P, the swivel movement of the swivel arm is transferred into a shifting movement of the corresponding carriage 30. With respect to the swivel axis of the corresponding swivel arm, the guide pin 54 can shift in the groove 52 in radial direction, so that changes of the distance between the swivel axis of the corresponding swivel arm and the position of the carriage 30 can be compensated.

Figure 3:
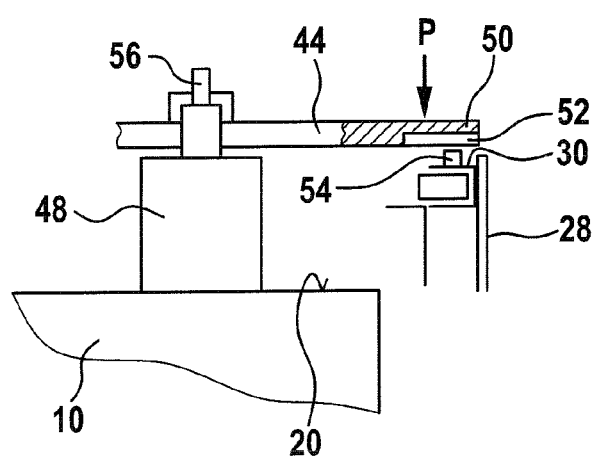
FIG. 3 shows a schematic, partly sectional side view of a first design variant of the first embodiment of the invention.

For shifting the swivel arm 42, 44, 46 in vertical direction, an actuator 56 can be used, for example, which is schematically shown in FIG. 3. A vertical stroke of the outer end 50 of the pivot levers can also be constructively accomplished in another way. Moreover, it is not absolutely necessary to lift the entire swivel arm. It can be sufficient to merely lift the outer end. In addition, the connection between the carriage 30 and the swivel arm can be accomplished in a way other than by engagement of the guide pin 54 into the groove 52.

Figure 4:
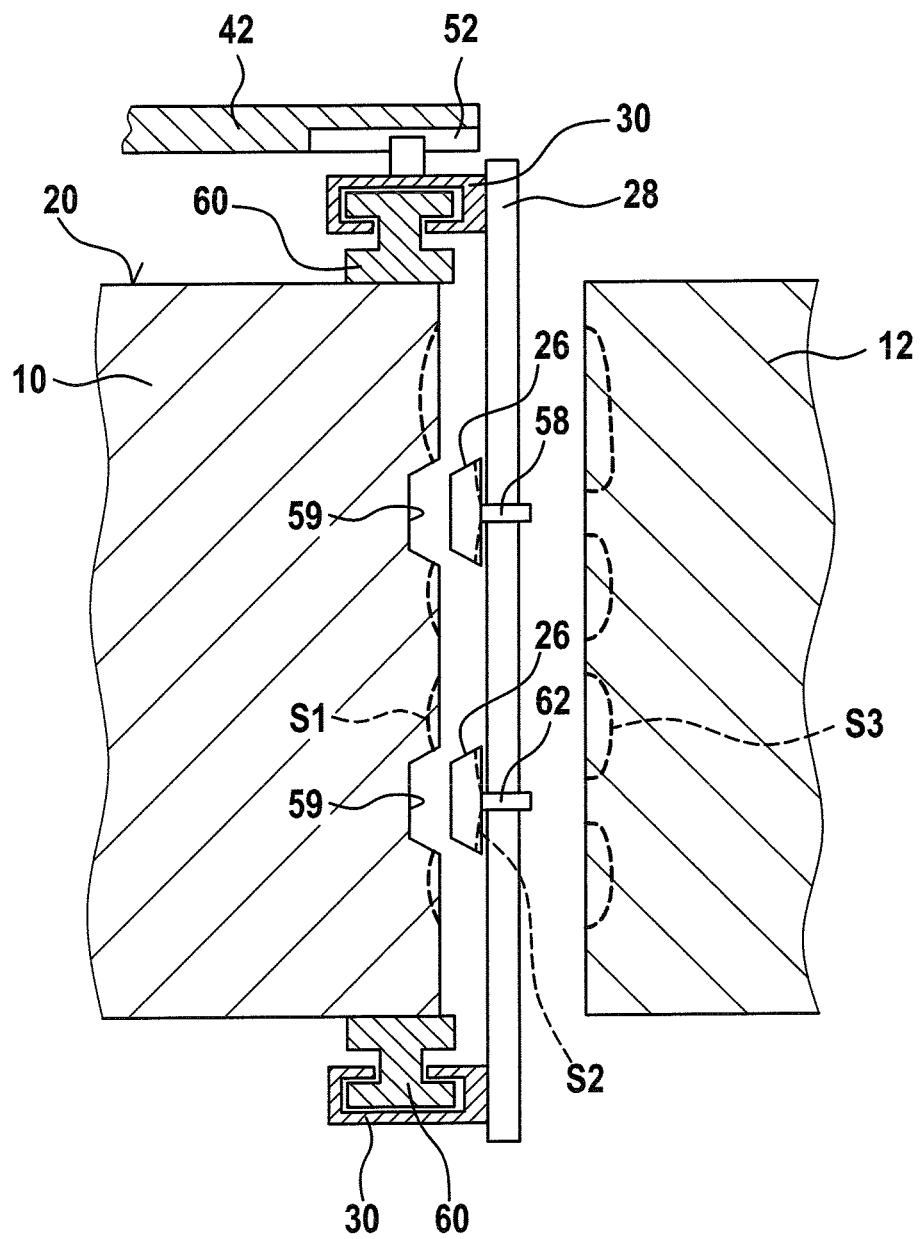
FIG. 4 shows a schematic sectional view of the injection molding tool according to the first design variant.
Figure 5:
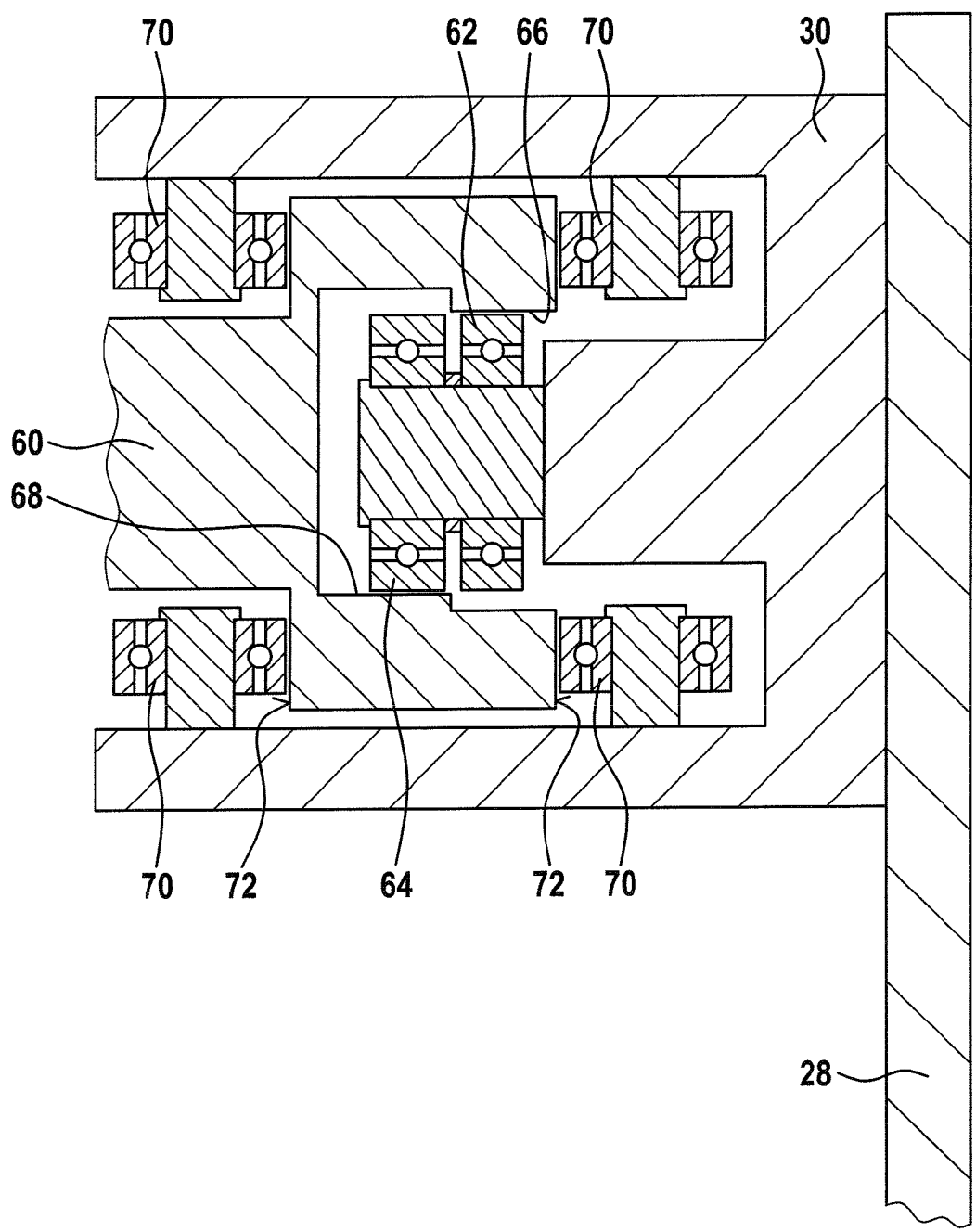
FIG. 5 shows a schematic sectional view of a carriage which is mounted on a rail.
Figure 6:
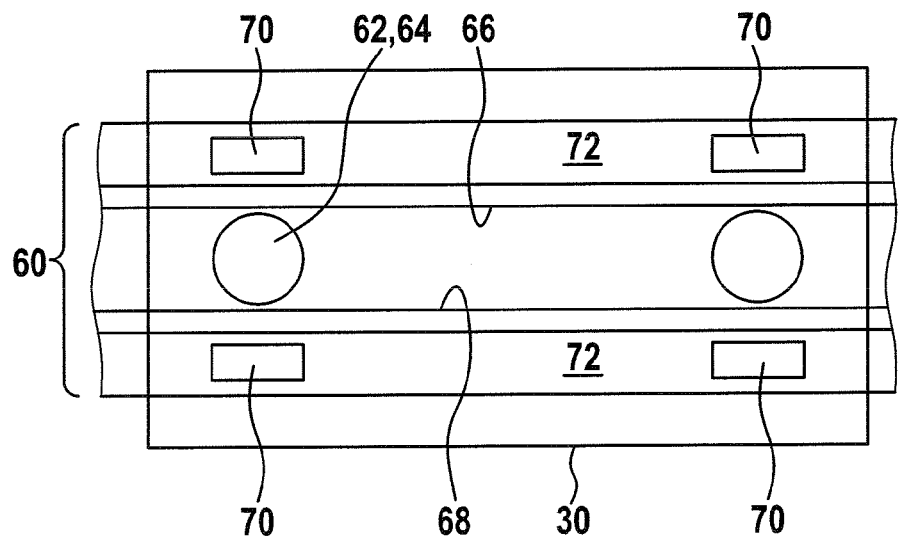
FIG. 6 shows a schematic side view of the arrangement of the ball bearings of the carriage of FIG. 5.

With reference to FIGS. 4 to 6 it will be described below how the movable mold parts 26 are mounted at the central tool part 10.

For guiding the carriages 30, a rail 60 each is mounted in the region of each end face 20 of the central tool part 10. The same, for example, can be screwed to the corresponding end face. At each of its ends, the transverse strut 28 is firmly connected with the carriage 30 which is shiftably guided on the two rails 60. The movable mold part 26 is shiftably mounted on the transverse strut 28, for example by a pin 58 which is accommodated in the transverse strut 28. The movable mold parts 26 can be inserted into suitable depressions 59 in the central tool part 10, so that injection molding cavities are formed, which consist of a central part S1, S2 and an outer part S3.

For mounting the carriages 30 on the rail 60, in particular ball bearings can be used, to achieve a precise guidance in the vertical direction (with respect to the representation of FIG. 1) and in a direction vertical to the direction of extension of the rail 60. For guidance in the vertical direction a double ball bearing is used, which is formed by two radial ball bearings 62, 64 arranged at a distance from each other. The same are running on two guideways 66, 68 vertically offset against each other, so that a friction-free guidance is ensured. For guidance in a direction vertical to the direction of extension of the rail 60, horizontal bearings 70 are provided, which engage running surfaces 72. As is shown in the schematic side view of FIG. 6, each carriage includes the bearing set shown in FIG. 5 at two ends facing away from each other, so that a tilt stability is given about an axis parallel to the direction of extension of the transverse strut 28.

Although it is shown in FIGS. 1 and 4 that also at the lower end of the transverse strut 28 a carriage 30 is provided, which is guided in a rail 60, it can also be provided in principle to mount the transverse strut 28 in a cantilevered manner only by using a single carriage, when the same provides a sufficiently stable guidance.

Figure 7:
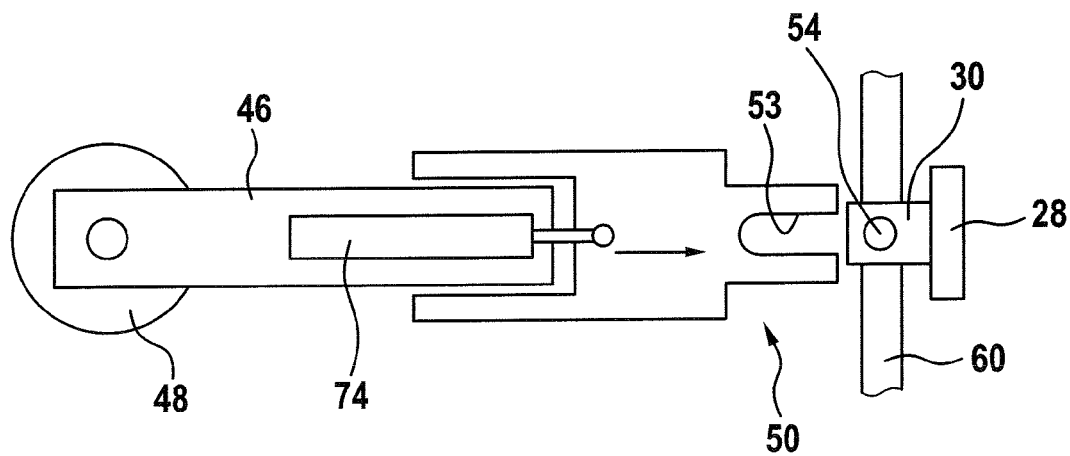
FIG. 7 shows a schematic top view of a second design variant of the first embodiment of the invention.

FIG. 7 shows an alternative design variant of the swivel arms, which differs with regard to the coupling with the carriage 30. In contrast to the embodiment shown in FIGS. 2 to 4, no vertical, but a radial movement is used here, in order to couple the swivel arm with the carriage. Concretely, the outer end 50 is mounted in a telescopically shiftable manner, so that a schematically illustrated actuating cylinder 74 can shift the outer end to the outside in direction of the arrow. As a result, a fork with a slit 53 engages with the guide pin 54 of the corresponding carriage 30.

Figure 8:
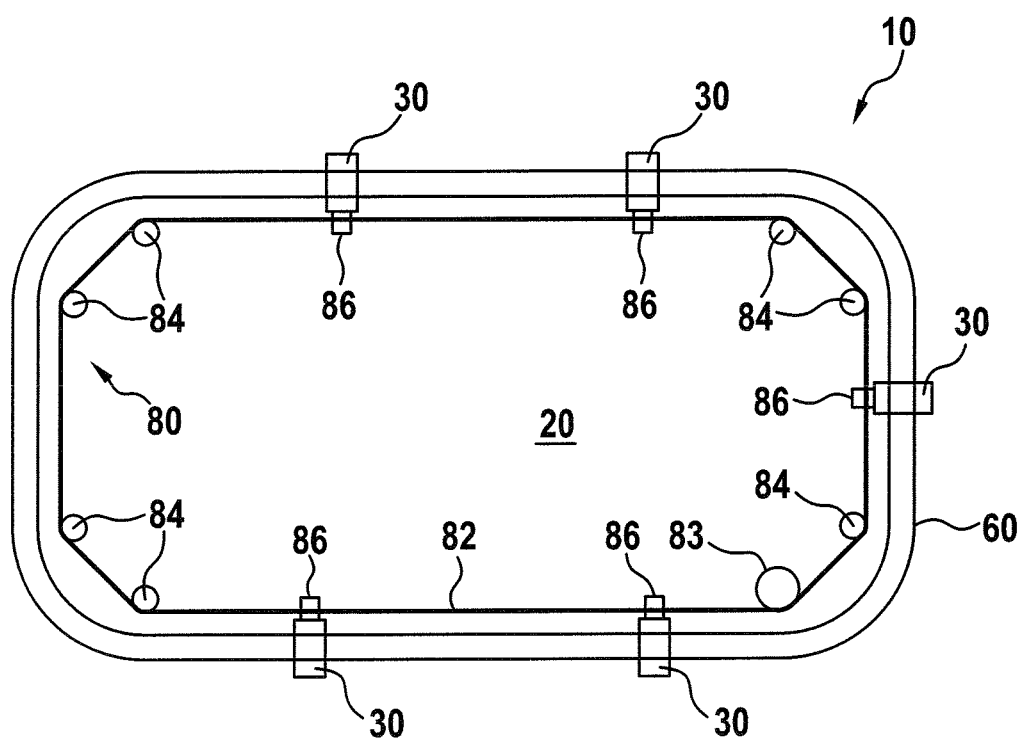
FIG. 8 shows a schematic top view of an injection molding tool according to a second embodiment of the invention.
Figure 9:
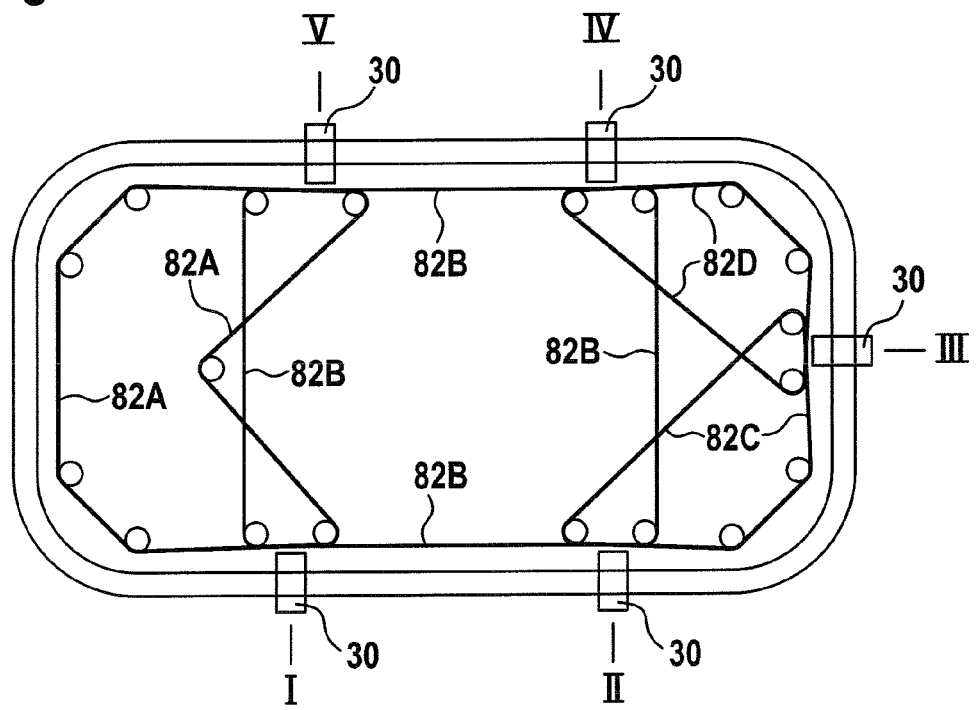
FIG. 9 shows a schematic top view of an injection molding tool according to a third embodiment of the invention.
Figure 10:
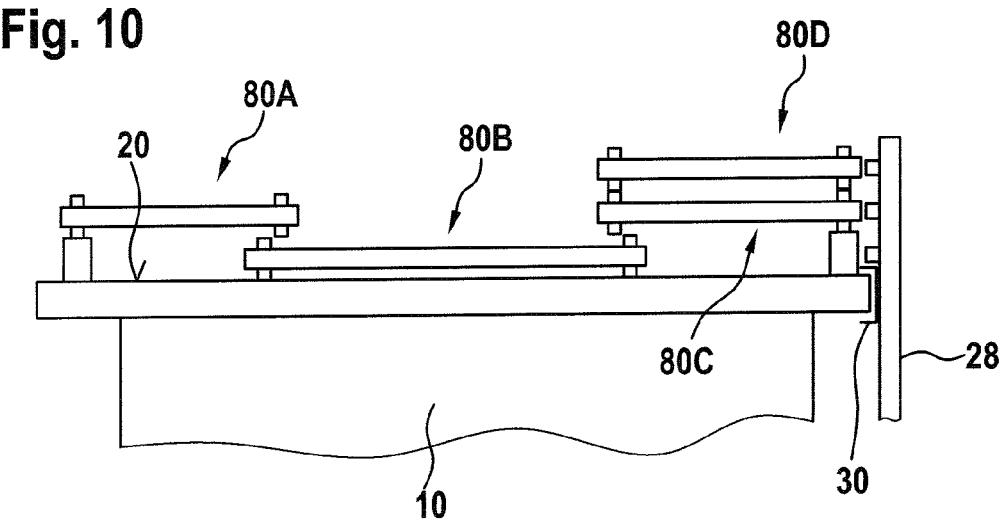
FIG. 10 shows the injection molding tool of FIG. 9 in a schematic side view.

In FIGS. 8 to 10 further embodiments are shown, which differ from each other with regard to the way of shifting the holders 28, 30 along the rail 60. In contrast to the first embodiment, in which swivel arms are used for moving the carriages 30, the drive 40 is formed by traction drives 80 in the embodiment according to FIGS. 8 to 10.

In the embodiments described below, the traction drives 80 are formed by belt drives. There can also be used other traction drives, which for example use a rotating chain, a rope, or another traction mechanism.

In the embodiment according to FIG. 8, a single rotating belt 82 is used, which is guided along a drive roller 83 and several deflection pulleys 84 in the vicinity of the rail 60. Each carriage 30 is provided with a coupling device 86 that couples the carriage 30 with the belt 82 in a controlled manner. The coupling device 86 can be formed by a contact surface and a clamping jaw cooperating with the same, with which the corresponding carriage 30 can be coupled to the belt 82, for example by a servo motor, an electromagnetic actuating drive, via spring force or pneumatically.

The carriages 30 can be moved into the respective next position by the belt drive 80. This can be accomplished by coupling the carriages 30 with the continuously rotating belt 82 by using the coupling devices, when they must be shifted from one position into the next between two machine cycles. As soon as the next position is reached, the carriages are decoupled there. It is also possible to first couple the carriages 30 with the stationary belt 82 and then drive the same.

In FIGS. 9 and 10 a third embodiment is shown, which like the second embodiment uses a belt drive as drive 40, but has similarity with the first embodiment with regard to the way in which the holders 28, 30 are moved between positions. In the third embodiment several separate belt drives 80A, 80B, 80C and 80D are used, which each are provided for moving on between two particular positions, so that a "hand-over" of the carriages is effected from station to station to another belt drive. From the position I a carriage 30 is shifted into the second position II by the belt 82 of the belt drive 80B. From there it can be shifted into the position III by means of the belt 82C of the belt drive 80C. From there it is the belt 82D of the belt drive 80D which can move the carriage on into the position IV. At this position it can in turn be coupled with the belt 82B of the belt drive 80B, in order to get into the fifth position. For moving on from the fifth position into the position I, the carriage 30 is coupled with the belt 82A of the belt drive 80A.

All embodiments have in common that the holders of the movable mold part, here concretely the carriages 30, can be releasably coupled with a drive, in order to move the same on from one position into another position. The releasable coupling leads to a high flexibility, since the injection molding tool can be converted with little effort. For example, it is possible to retool from a constellation with two different injection-molding stations on a side face 16 into a configuration with only one single injection-molding position, and the drive can be modified with little effort such that the holders then are shifted between the positions necessary in the new configuration.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An injection molding tool comprising:
a central tool part and two lateral tool parts which are shiftable relative to each other between an open and a closed position;
at least one injection molding cavity is defined by a central mold part arranged on the central tool part, a lateral mold part arranged on each of the two lateral tool parts, and a movable mold part mounted on a holder that is shiftable around the central tool part between various positions by a drive, the holder including at least one carriage which is shiftably mounted to a rail; and
wherein the carriage and the holder can be coupled with the drive in a controlled manner.

2. The injection molding tool according to claim 1, wherein the two lateral tool parts cooperate with two side faces of the central tool part, and wherein the drive is arranged on an end face of the central tool part.

3. The injection molding tool according to claim 2, wherein the drive is arranged on one end face only of the central tool part.

4. The injection molding tool according to claim 1, wherein the drive includes at least one swivel arm which is shiftable between two positions.

5. The injection molding tool according to claim 4, wherein an inner end of the at least one swivel arm is coupled with an actuator which is mounted at the central tool part.

6. The injection molding tool according to claim 4, wherein an outer end of the at least one swivel arm can be coupled with the holder.

7. The injection molding tool according to claim 6, wherein at least the outer end of the at least one swivel arm can perform a stroke parallel to a swivel axis defined by the at least one swivel arm, in order to be coupled with the holder or be released from the holder.

8. The injection molding tool according to claim 6, wherein the at least one swivel arm can be telescopically extended outside in order to be coupled with the holder or be released from the holder.

9. The injection molding tool according to claim 4, wherein the at least one swivel arm is a double arm and includes two outer ends.

10. The injection molding tool according to claim 1, wherein the drive includes at least one traction drive.

11. The injection molding tool according to claim 10, wherein the at least one traction drive extends along a circumference of the central tool part, and wherein a separate drive is associated with each traction drive.

12. The injection molding tool according to claim 10, wherein the at least one traction drive comprises two or more traction drives which each are arranged along a part of a circumference of the central tool part, and wherein a separate drive is associated with each traction drive.

13. The injection molding tool according to claim 10, wherein the holder is provided with a coupling device that couples the holder with the traction drive in a controlled manner.

14. The injection molding tool according to claim 1, wherein the carriage is mounted on the rail via anti-friction bearings, a roller guideway, and/or a linear guideway.

15. The injection molding tool according to claim 1, wherein the carriage is mounted on the rail substantially without clearance via at least one double ball bearing.

16. The injection molding tool according to claim 1, wherein the holder includes a transverse strut which is connected with the carriage and on which the movable mold part is mounted.

17. The injection molding tool according to claim 16, wherein the movable mold part is shiftable on the transverse strut between an injection molding position and an extracted position.

18. The injection molding tool according to claim 4, wherein the at least one swivel arm comprises a plurality of swivel arms that are separate from each other.

19. The injection molding tool according to claim 18, wherein each swivel arm swivels about an axis that is separate from an axis of an adjacent pivot arm.

20. The injection molding tool according to claim 4, wherein the at least one swivel arm comprises at least a first swivel arm that swivels about a first axis, a second swivel arm that swivels about a second axis that is spaced apart from the first axis, and a third swivel arm that swivels about a third axis that is spaced apart from the first and second axes.

21. The injection molding tool according to claim 1, wherein the drive is arranged on an end face of the central tool part, and wherein the drive includes at least one swivel arm extending between first and second arm ends, wherein at least one arm end is releasably coupled to the at least one carriage, and wherein the swivel arm is driven by an actuator between at least two different positions.

22. The injection molding tool according to claim 1, wherein the drive is releasably coupled to the holder.

* * * * *